United States Patent [19]

Jain

[11] Patent Number: 5,281,972
[45] Date of Patent: Jan. 25, 1994

[54] BEAM SUMMING APPARATUS FOR RCS MEASUREMENTS OF LARGE TARGETS

[75] Inventor: Atul Jain, Los Angeles, Calif.

[73] Assignee: Hughes Aircraft Company, Los Angeles, Calif.

[21] Appl. No.: 949,912

[22] Filed: Sep. 24, 1992

[51] Int. Cl.$^5$ .............................................. G01S 13/00
[52] U.S. Cl. ....................................... 342/25; 342/165
[58] Field of Search ........................... 342/25, 165, 173

[56] References Cited

U.S. PATENT DOCUMENTS

| | | | |
|---|---|---|---|
| H741 | 2/1990 | Powell et al. | 342/25 |
| 4,546,355 | 10/1985 | Boles | 342/25 X |
| 4,616,227 | 10/1986 | Homma et al. | 342/25 |
| 5,059,966 | 10/1991 | Fujisaka et al. | 342/25 |
| 5,075,681 | 12/1991 | Kartiala | 342/165 |
| 5,140,331 | 8/1992 | Aulenbacher et al. | 342/165 |

Primary Examiner—Mark Hellner
Attorney, Agent, or Firm—L. A. Alkov; W. K. Denson-Low

[57] ABSTRACT

Systems and methods for measuring RCS patterns of large targets in a compact target range having limited size. The present invention utilizes a compact range whose sweet spot (corresponding to the imaged area of the target) is much smaller than the target size. Inverse synthetic array radar (ISAR) images of successive sections of the target are registered to form a composite image of the whole target. The image is then Fourier transformed to generate an RCS value of the full target. This procedure is repeated for successive measurement angles, an RCS versus $\theta$ plot is generated corresponding to the RCS pattern of the target. The multiple images may be generated by translating the target and computing RCS plots of the target by combining the multiple images produced during translation, or generating the the multiple images by moving feeds or using multiple feeds of the ISAR system.

14 Claims, 2 Drawing Sheets

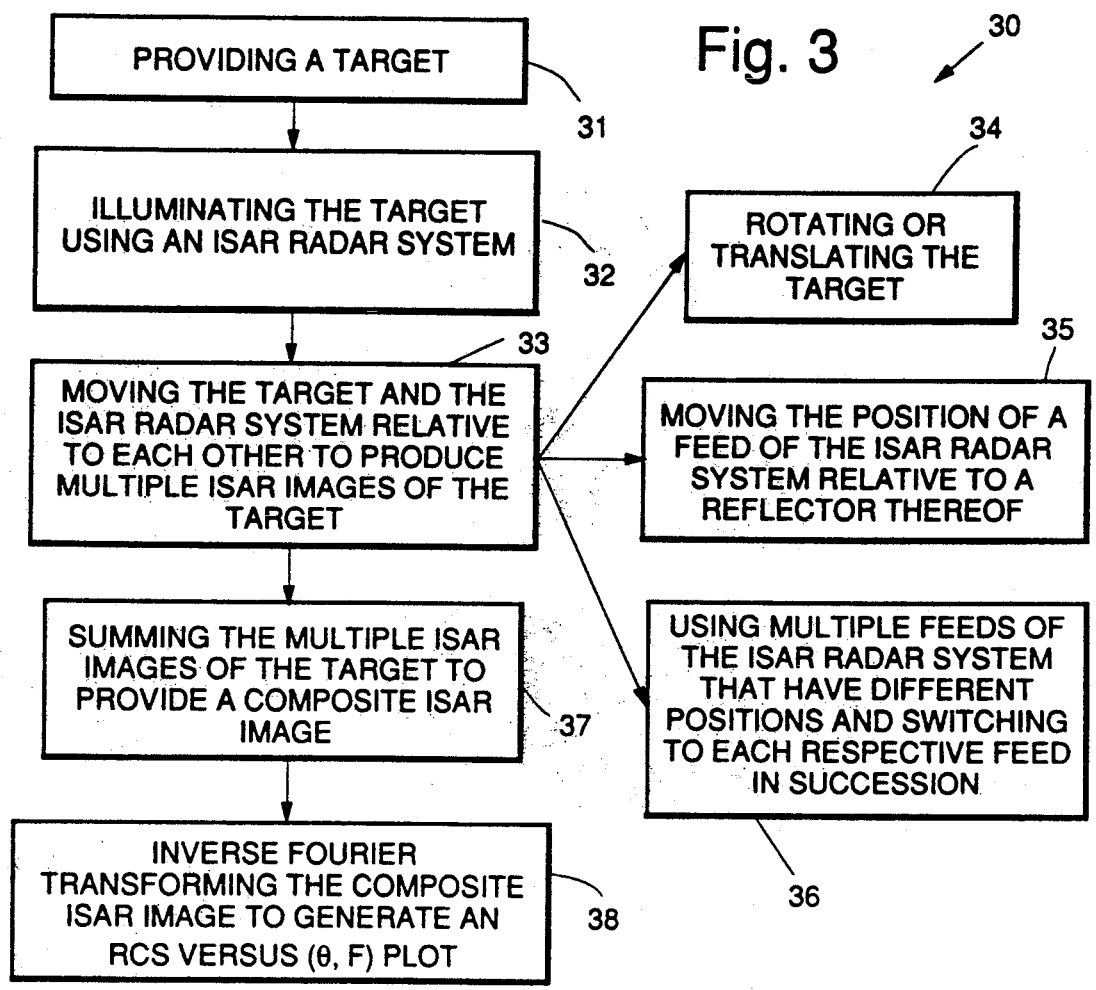
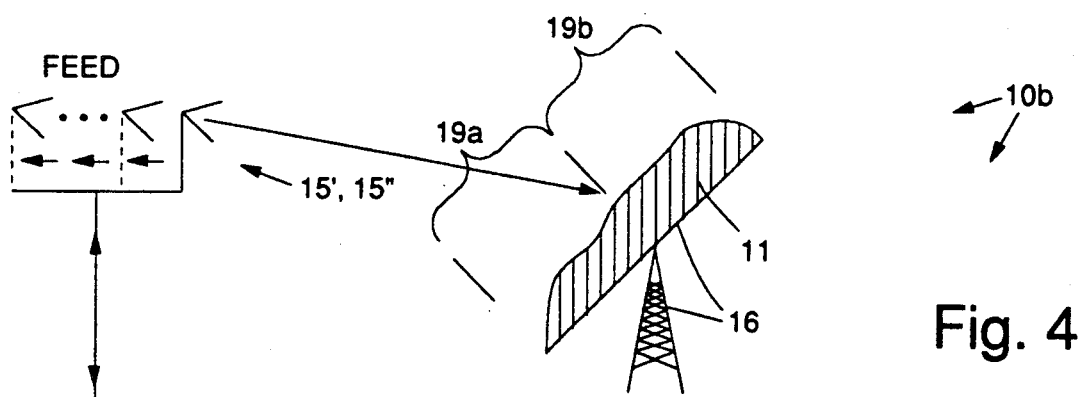
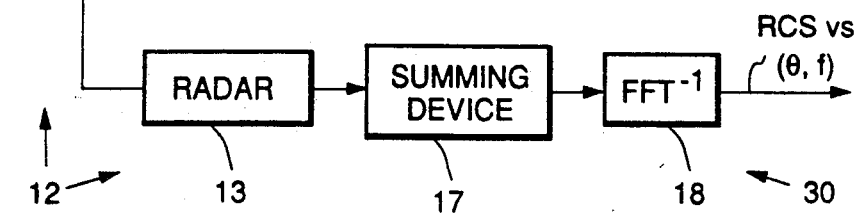
Fig. 4

BEAM SUMMING APPARATUS FOR RCS MEASUREMENTS OF LARGE TARGETS

BACKGROUND

The present invention relates to systems and methods for measuring RCS patterns of large targets, and more particularly, to a system and methods for measuring RCS patterns of large targets in a compact target range of limited size.

It has not previously been possible to measure the radar cross section (RCS) of large targets in an indoor compact range. This is because conventional techniques used to make such RCS measurements are prohibitively expensive. Such ranges require reflectors whose sizes are at least twice the size of the target and a chamber whose height and width are each more than three times the size of the target. Furthermore, these items increase dramatically in cost as the sizes of the reflectors and chambers increase. Measurement of the RCS patterns of large targets in a compact range of limited size is of interest to those skilled in the art since the cost of building a chamber is estimated at roughly one million dollars per foot of target length.

It is therefore an objective of the present invention to provide for apparatus and methods that permits RCS measurements of large targets in existing lower cost and smaller size chambers.

SUMMARY OF THE INVENTION

In order to provide for the above and other objectives, the present invention provides for apparatus and methods for measuring RCS patterns of large targets in a compact target range of limited size. The present invention utilizes a compact range whose "sweet spot" (corresponding to the imaged area of the target) is much smaller than the target size.

Inverse synthetic array radar (ISAR) images of successive sections of the target are registered to form a composite image of the whole target. The ISAR images are generated from electric fields derived from the target. The image is then Fourier transformed to generate an RCS value of the full target. This procedure is repeated for successive measurement angles, and an RCS versus $\theta$ plot is generated corresponding to the RCS pattern of the target. The display of RCS versus $\theta$ values is in terms of relative intensity values.

The multiple images may be generated by translating the target and computing RCS plots of the target by combining the multiple images produced during translation, or generating the multiple images by moving feeds or using multiple feeds of the ISAR system.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3 is a flow diagram illustrating the method of determining RCS plots of a target in accordance with the principles of the present invention; and FIG. 4 illustrates yet other embodiments of a system and method that measures RCS patterns of a large target in accordance with the principles of the present invention using multiple ISAR images and wherein the multiple images are generated, or a final composite image is generated, by moving feeds or using multiple feeds.

DETAILED DESCRIPTION

Figure 1:
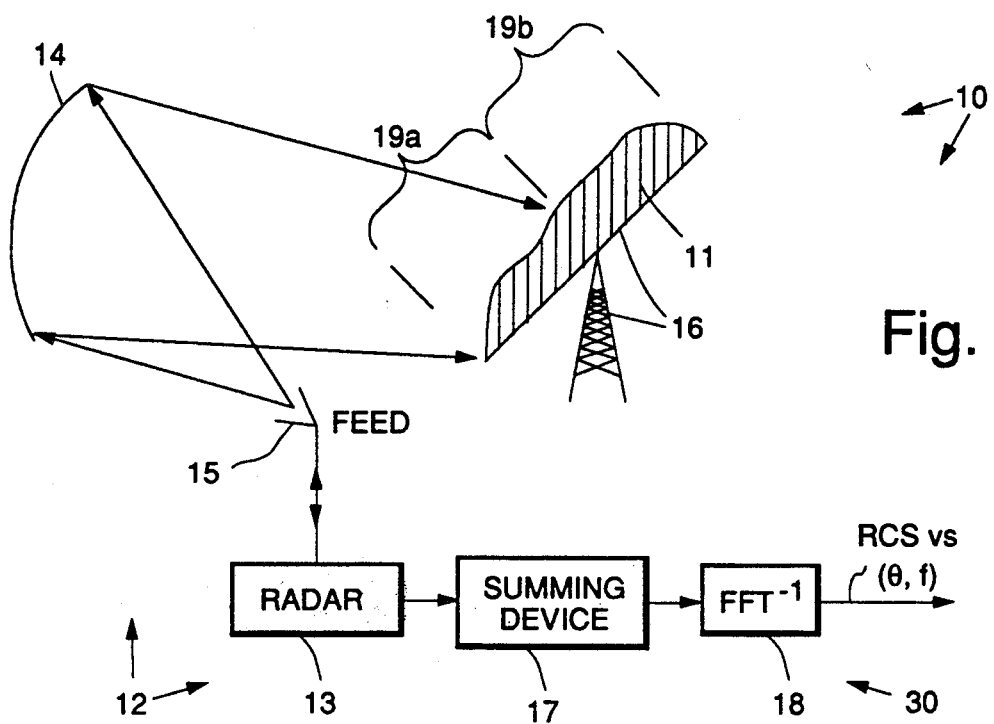
FIG. 1 illustrates a first embodiment of a system and method that measures RCS patterns of a large target in accordance with the principles of the present invention and generates multiple ISAR images by translating a target and computing RCS plots of the target by combining the multiple images.

Referring to the drawing figures, and with reference to FIG. 1, it illustrates a first embodiment of a system 10 and two of the present methods 30 that measures RCS patterns of a large target 11 in accordance with the principles of the present invention. The present system 10 and method 30 generate multiple ISAR images by moving the target 11 relative to an inverse synthetic array radar illuminator system 12 and computing RCS versus ($\theta$,f) plots of the target 11 by combining multiple images generated by the inverse synthetic array radar illuminator system 12. In the context of this disclosure, moving the target 11 comprises rotating the target 11 relative to a radar system 12 having a single fixed position feed 15, translating the target 11 along a predefined path relative to a radar system 12 having a single fixed position feed 15, moving a single feed 15' of the radar illuminator system 12 to selected positions along a predetermined path relative to a reflector 14 of the radar illuminator system 12 and successively generating images at each of the positions, and providing a radar illuminator system 12 having a plurality of feeds 15a-15n disposed along a predetermined path and successively generating images by switching to each of the feeds 15a-15n.

More specifically, the present system 10 comprises the inverse synthetic array radar illuminator system 12 which includes an ISAR radar system 13, the reflector 14, and the single feed 15. The present system 10 also includes a summing device 17 or combiner 17 for summing the plurality of ISAR images that are produced by the present invention in the various ways described above. The output of the summing device 17 is coupled to a fast Fourier transform device 18 that provides a Fourier transformed image of the output of the summing device 17. The output of the summing device 17 comprises an RCS versus ($\theta$,f) plot. ISAR signals are radiated from the feed 15 and are imaged on a plurality of sub-areas 19a, 19b the target 11 by the reflector 14. The target 11 is mounted on a platform 16 that is adapted to rotate and/or translate the target 11 relative to the reflector 14.

In the embodiment of FIG. 1, the inverse synthetic array radar illuminator system 12 illuminates successive sub-areas of the target 11, illustrated by the two sub-areas 19a, 19b. As was stated above, this may be accomplished by translating or rotating the target 11. For example, the target 11 is rotated or the angle of illumination to the target 11 is changed and images of the illuminated sub-areas 19a, 19b are generated and combined in the summing device 17 to form a composite image of the target 11. This is repeated over a number of angles while the target 11 is rotated to generate a plurality of ISAR images over a range of angles of interest. The summed or composite image is then transformed by the fast Fourier transform device 18 to generate an RCS versus ($\theta$,f) plot. For RCS versus $\theta$ where the angles of interest fall in a small range, direct measurements of the radar cross section for the sub-angles are combined coherently in the summing device 17 in a conventional manner to generate the combined radar cross section of the whole target 11.

Figure 2:
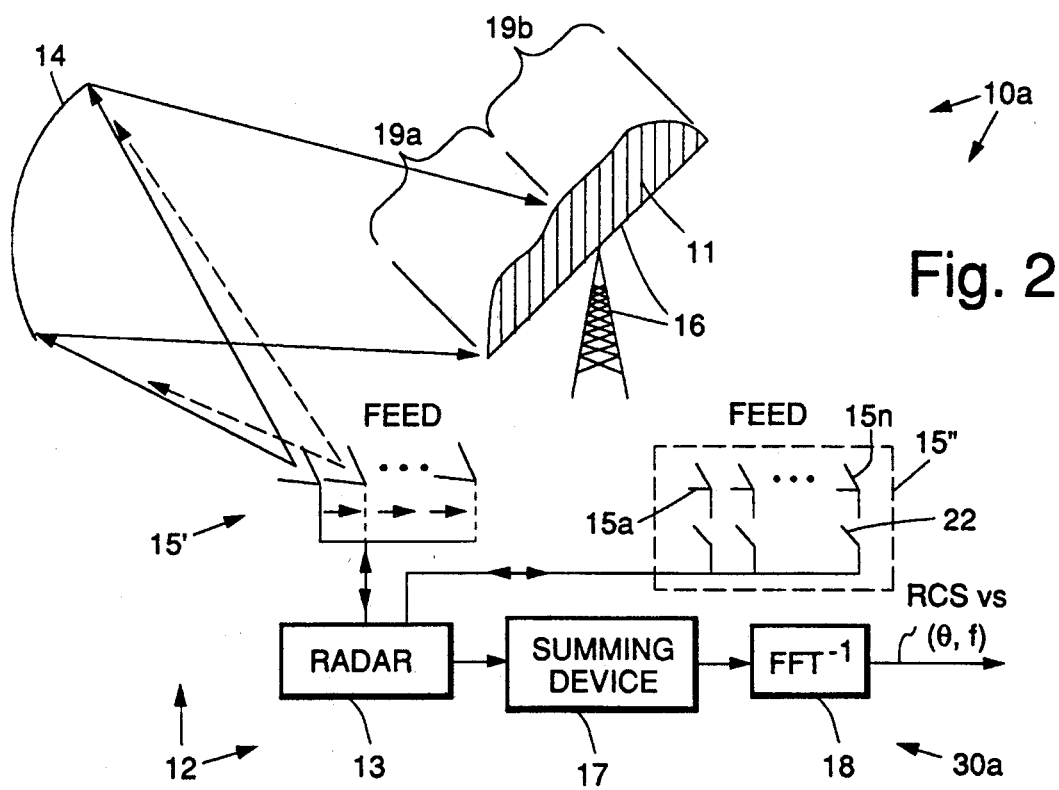
FIG. 2 illustrates other embodiments of a system and method that measures RCS patterns of a large target in accordance with the principles of the present invention using multiple ISAR images and wherein the multiple images are generated by moving feeds or using multiple feeds.

Referring to FIG. 2, it shows other embodiments of the present invention comprising a system 10a and method 30 that measures RCS patterns of the large target 11 using multiple ISAR images. A first way to generate the images is to move a single feed 15' of the radar illuminator system 12 to selected positions along a predetermined path relative to a reflector 14 and successively generate images at each of the positions. A second way to generate the images is to provide a radar illuminator system 12 having multiple feeds 15a-15n with individual switches 22 (illustrated by the dashed box identified as feeds 15") and that are disposed along a predetermined path and that have different positions relative to the reflector 14, and successively generate images by switching to each of the feeds 15" and generating an image for that selected feed 15a-15n.

Regarding the operation of the second embodiment, illumination of the target 11 is accomplished by translating the single feed 15 along the predetermined path, for example. At each selected position along the path, an image is generated. The summing device 17 generates a composite image from the images that have been generated at all of the selected positions along the path. The composite image is then transformed by the fast Fourier transform device 18 to provide an RCS versus ($\theta$,f) plot.

Alternatively, the operation of the second embodiment is such that the illumination of the target 11 is accomplished by providing multiple feeds 15a-15n in the radar system 13 that are disposed along the predetermined path, and are switched on in succession to provide for the multiple ISAR images as described above. It should be relatively clear that any of the above-described techniques of generating a plurality of sampled ISAR images that are summed to generate a composite image may be employed in the systems 10, 10a of the present invention.

FIG. 3 is a flow diagram illustrating several methods 30 of generating an RCS plot of the target 11 in accordance with the principles of the present invention. The basic method 30 is to provide a relatively large target 31. The target is then illuminated using an ISAR radar system 32. The target 11 and the ISAR radar system 12 are then moved relative to each other 33 to produce multiple ISAR images of the target. The relative motion of the target 11 and the ISAR radar system 12 may be achieved in several ways. The target 11 may be rotated or translated 34 relative to the ISAR radar system 12. A feed of the ISAR radar system 12 may be moved 35 along a predetermined path relative to the reflector. Multiple feeds may be employed in the ISAR radar system 12 and ISAR images are generated 36 at each of the feed positions. Once the multiple ISAR images of the target 11 are generated the images are summed 37 to produce a composite image. Finally, an inverse Fourier transform 38 is performed on the composite image to generate the RCS versus ($\theta$,f) plot.

FIG. 4 illustrates yet other embodiments of a system 10b and method that measures RCS patterns of a large target using multiple ISAR images, or a final composite SAR image, and wherein the images are generated by moving feeds 15' or multiple feeds 15". The system 10b of FIG. 4 employs the feed arrangement shown in FIG. 2 which replaces the reflector 14 and is directly used to generate the ISAR signals for processing. The balance of the system employs the inverse synthetic array radar illuminator system 12, comprising the ISAR radar system 13 and the summing device 17, and the Fourier transform device 18 that provides Fourier transformed image of the output of the summing device 17. The operation of the embodiment of FIG. 4 is substantially the same as the embodiment shown and described with reference to FIG. 2.

Thus there has been described a new and improved apparatus and methods for measuring RCS patterns of large targets in a compact target range of limited size. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method of generating an RCS versus ($\theta$,f) plot for a relatively large target with respect to beam width, said method comprising the steps of:
   providing a relatively large target with respect to beam width;
   illuminating the target using an ISAR radar system;
   moving the target and the ISAR radar system relative to each other to produce multiple ISAR images of a plurality of sub-areas comprising the target;
   producing a composite image of the target derived from the multiple ISAR images of the sub-areas of the target; and
   performing an inverse Fourier transform on the composite image to generate the RCS versus ($\theta$,f) plot for the target.

2. The method of claim 1 wherein the step of producing a composite image of the target comprises the step of:
   summing the multiple ISAR images of the sub-areas of the target to produce a composite image of the target.

3. The method of claim 1 wherein the step of producing a composite image of the target comprises the step of:
   combining data from multiple ISAR images of the sub-areas of the target to directly generate a composite ISAR image.

4. The method of claim 1 wherein the step of moving the target relative to the radar system comprises the step of:
   rotating the target relative to a radar system having a single fixed position feed.

5. The method of claim 1 wherein the step of moving the target relative to the radar system comprises the step of:
   translating the target along a predefined path relative to a radar system having a single fixed position feed.

6. The method of claim 1 wherein the step of moving the target relative to the radar system comprises the step of:
   moving a single feed if the radar illuminator system to selected positions along a predetermined path relative to a reflector of the radar illuminator system and successively generating images at each of the positions.

7. The method of claim 1 wherein the step of moving the target relative to the radar system comprises the step of:

moving a single feed of the radar illuminator system to selected positions along a predetermined path and successively generating images at each of the positions.

8. The method of claim 1 wherein the step of moving the target relative to the radar system comprises the step of:

providing a radar illuminator system having a plurality of feeds disposed along a predetermined path and successively generating images by switching to each of the feeds.

9. A system for producing an RCS versus $(\theta,f)$ plot of a relatively large target, said system comprising:

a target disposed at a predetermined location;

an inverse synthetic array radar (ISAR) system disposed at a predetermined location relative to the target that comprises an ISAR radar system having at least one feed and a reflector for focusing ISAR radar signals onto the target, and wherein the target and the ISAR radar system are moved relative to each other to produce multiple ISAR images of a plurality of sub-areas comprising the target;

a summing device coupled to the ISAR radar system for producing a composite image from a plurality of ISAR images produced by the ISAR radar system; and an inverse Fourier transform device for producing an RCS versus $(\theta,f)$ plot of the target.

10. The system of claim 9 wherein the target is rotated relative to the radar system having and wherein the at least one feed comprises a single fixed position feed.

11. The system of claim 9 wherein the target is translated along a predefined path relative to the radar system and wherein the at least one feed comprises a single fixed position feed.

12. The system of claim 9 wherein the inverse synthetic array radar (ISAR) system comprises a single feed that is successively moved to selected positions along a predetermined path relative to a reflector and wherein images are successively generated at each of the positions.

13. The system of claim 9 wherein the inverse synthetic array radar (ISAR) system comprises a single feed that is successively moved to selected positions along a predetermined path and wherein images are successively generated at each of the positions.

14. The systems of claim 9 wherein the inverse synthetic array radar (ISAR) system comprises a plurality of feeds disposed along a predetermined path and wherein images are successively generated by switching to each of the feeds to generate an image.

* * * * *